Dec. 10, 1940. HANS-JOACHIM ZILLER 2,224,532
CONNECTING HOOK FOR CONVEYER BANDS AND THE LIKE
Filed March 16, 1939 2 Sheets-Sheet 1
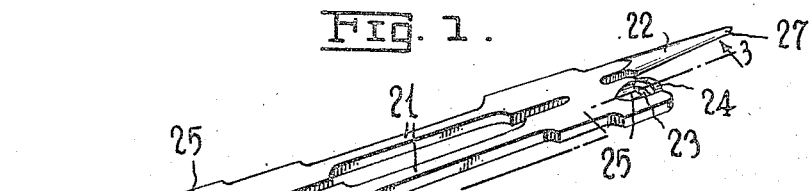
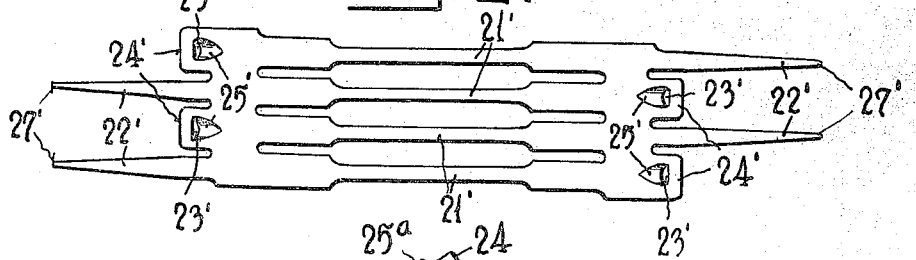
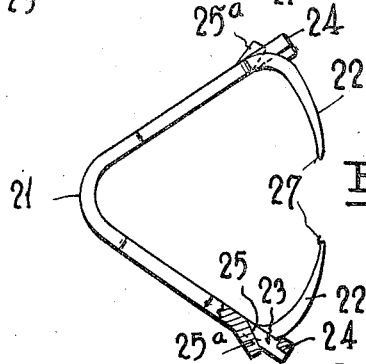
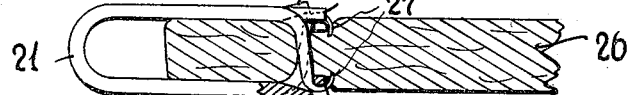
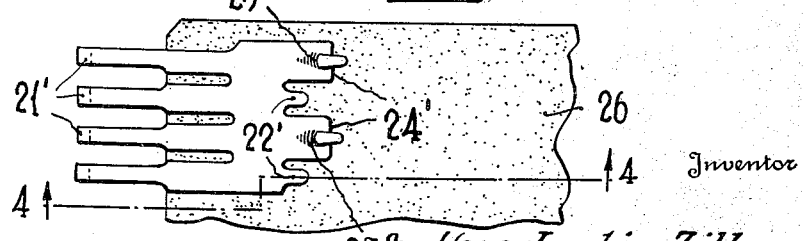
Inventor
Hans-Joachim Ziller Dec. 10, 1940. HANS-JOACHIM ZILLER 2,224,532
CONNECTING HOOK FOR CONVEYER BANDS AND THE LIKE
Filed March 16, 1939 2 Sheets-Sheet 2
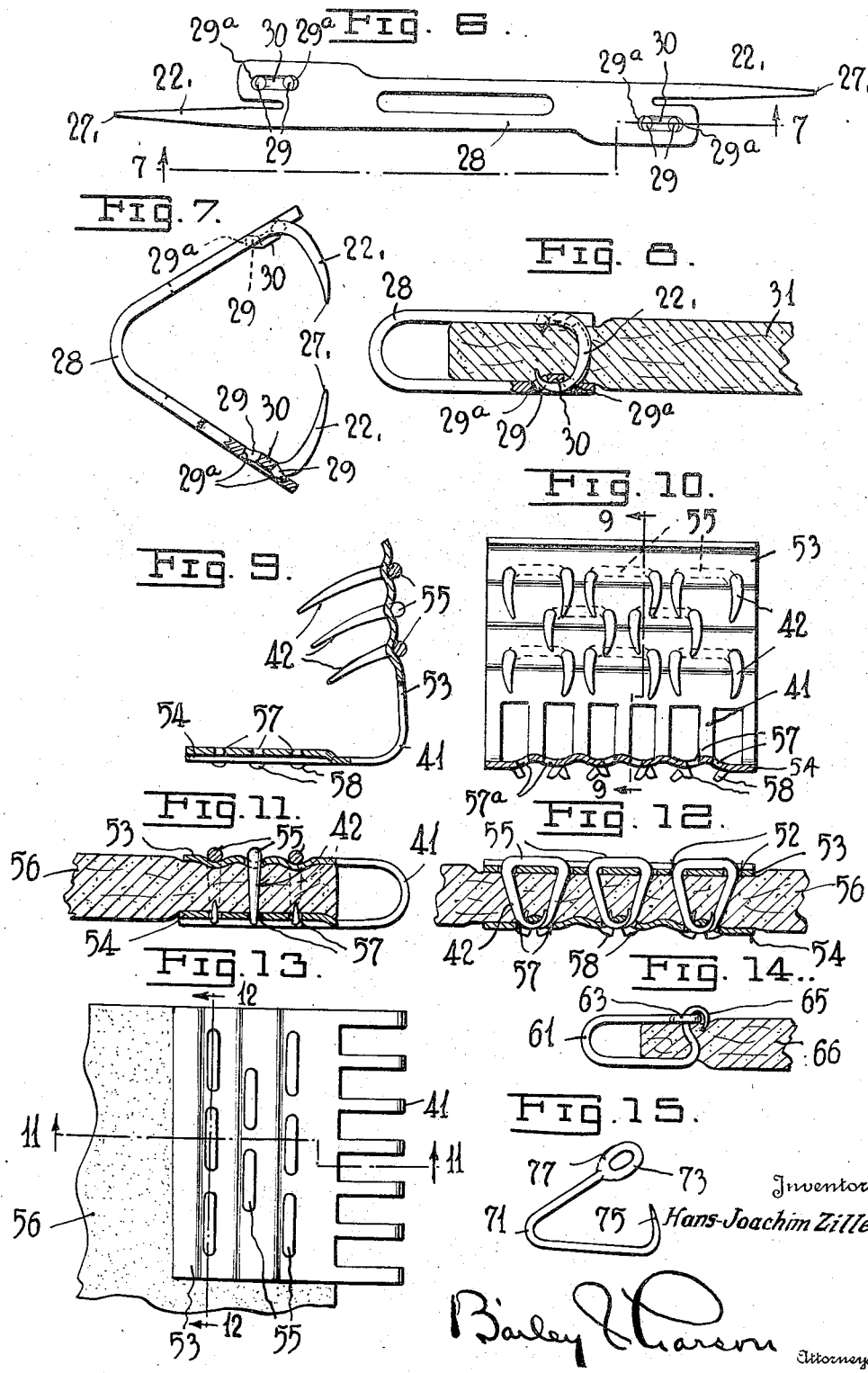

Patented Dec. 10, 1940

2,224,532

UNITED STATES PATENT OFFICE 2,224,532

CONNECTING HOOK FOR CONVEYER BANDS AND THE LIKE

Hans-Joachim Ziller, Dusseldorf, Germany

Application March 16, 1939, Serial No. 262,278
In Germany November 18, 1937

21 Claims. (Cl. 24—33)

The present invention relates broadly to detachable connecting hooks for joining the ends of conveyer bands, and more specifically it relates to belt hooks stamped from sheet metal.

Heretofore, the most widely used belt hooks have been those formed of a strip of material with tines at the ends. When the strip is bent V-shaped and placed around an end of the belt, the tines are bent inwardly in opposed relationship, so that the tines roll up in the material of the belt itself when the ends of the strip are pressed towards each other.

An object of the present invention is to provide a hook which will not pull out when the belt is suddenly stopped, caught, reversed or subjected to other rough treatment, as in mining operations. And a most particular object is to prevent the straightening out and the tearing out of the tines from the material at the belt ends, and the simultaneous outward bending of the ends of the hook, as has heretofore occurred, while the rest of the belt is otherwise able to withstand the hard usage.

It is now proposed to meet these problems by providing a belt hook which, when its parts are placed on an end of a conveyer belt, the tines are pressed through the belt and are automatically locked in the opposite end of the hook, thus providing a hook in the form of a completely closed ring.

Another object is to provide a belt hook which may be attached by compressing apparatus now commonly used. It is also intended to provide a hook which can be made of sheet metal, formed in a simple stamping operation and, in some instances, of bent wire or the like, and which will more than compensate for its cost in the savings on belt ends and covers.

Again, it is intended to provide a hook that is easy to repair. In the present invention, pressing a new tine through the belt and locking it into the opposite hook end to replace a broken one is but a short operation and does not require replacement of the entire hook.

With other and lesser objectives in view, the invention is described and illustrated by the following specification and drawings, in which:

Fig. 1 is a perspective view of the first embodiment;

Fig. 2 is a plan view of the second embodiment;

Fig. 3 is a side elevation, partly on section along the line 3—3 of the hooks shown in Fig. 1 when ready for installation;

Fig. 4 is a side elevation, partly in section, along the line 3—3 of Fig. 1 through the end of a conveyer belt showing the hook attached;

Fig. 5 is a plan view of the embodiment shown in Fig. 2 when attached;

Fig. 6 is a plan view of a third embodiment;

Fig. 7 shows the third embodiment of Fig. 6 when ready for attachment, broken away along the lines 7—7;

Fig. 8 is a section taken along the lines 7—7 of Fig. 6 showing the Fig. 6 embodiment attached;

Fig. 9 is a section, partially in perspective, of a fourth modification of the invention;

Fig. 10 is an end view looking towards the closed end of the V-shaped hook;

Fig. 11 is a longitudinal section through line 11—11 of Fig. 13;

Fig. 12 is a transverse cross section along line 12—12 of Fig. 13;

Fig. 13 is a plan view of the fourth modification;

Fig. 14 is a side elevation, partially in perspective, of still another modification; and Fig. 15 is an alternate form of the member shown in Fig. 14.

As shown in Fig. 1, the hook is formed by a stamped blank of sheet metal having central coupling strips 21, a tine 22 at each end, the tines being in staggered relation to one another. Adjacent each of the tines and also staggered relative to one another are openings 23, which are defined by the transverse arched web 24 on the outer sides and oppositely arched webs 25a on the inner sides which form guide surfaces 25.

A multiplication of the elements shown in Fig. 1 is described in Fig. 2 wherein a continuation of the elements is carried out, the counterparts of the first embodiment being designated by prime numerals.

The operation of the device shown in Figs. 1 and 2 is shown in Figs. 3 and 4. The tines 22 are bent upwardly and the blank is bent to form a V, the strips 21 forming the closed end of the V. Then the hook is placed over the end of a belt, as illustrated by the reference numeral 26 in Figs. 4 and 5, and the legs of the V are pressed together by any one of the well-known pincer tools. The sharp ends of the tines pierce the belt and, upon passing completely through, engage the guide surfaces 25a. Since the guide surfaces 25a are arcuate and also inclined towards the openings 23, the ends 27 of the tines 22 are forced through the openings 23 and roll on around past the webs 24 and re-engage the belt 26. As the ends of the hook are squeezed by the tool, the guide surface webs 25 are pressed inwardly against the tines 22, thereby providing a flat surface on each side of the assembly and also preventing withdrawal of the tines.

The modification shown in Figs. 6 to 8 inclusive is similar in principle to the first form except that the strips 28 have a pair of openings 29 at each end, the pairs being in staggered relationship similarly to the openings 23. Instead of having guide surfaces, 25a, the openings are inclined towards each other, and transverse webs 30 extend between them.

The elements shown in Figs. 6 to 8, which are shown in the first embodiment, are denoted by sub-prime numerals.

When the ends of the hook shown in Figs. 6 to 8 are placed over the end of a belt, designated 31 in Fig. 8, the ends of the tines 22 engage the side walls 29a of the outer member of the pair of openings 29 and, upon further pincing of the ends of the hook, the tines 22 pass through the outer openings, are curled around the webs 30 and pass back through the tines of the openings 29 to re-engage the belt 31.

In the modification illustrated in Figs. 9 to 13 the strips 41 have upper and lower plates 53 and 54 respectively, the upper plate being transversely corrugated, the lower being longitudinally corrugated, at their ends. The upper plate 53 is provided with pairs of openings 52 extending lengthwise the corrugations, and the lower plate 54 has pairs of inclined openings 57, the members of each pair being slightly staggered longitudinally from one another. Legs 42 of staples 55 are passed through the openings, and the hook, after having been bent to form a V as shown best in Fig. 9, is placed over the end of a belt 56 and the plates are then compressed in the usual manner. In this case, the legs 42 of the staples 55 engage the side walls 57a of the openings 57 in the lower plate and are thus curled back around through the adjacent opening upon further compression of the plates.

The pairs of openings 57 in the lower plate are spaced with one opening on each side of a corrugation rib. The tabs 58, together with the inclined walls of the openings 57, form guide surfaces for curving staple legs 42 as they are pressed through. The tabs 58 also serve to prevent the withdrawal of the staples when finally compressed.

It should be noted that the pairs of openings 57 in the lower plate are of less span than the pairs 52 in the upper plate 53 and that the legs 42 of the staples 55 are bowed inwardly at their point ends. This facilitates recurving of the staples when the hook is pressed over a belt end.

The staples may also be connected to the plate 53 by welding or soldering, or may be stamped and bent from the plate material.

In Fig. 14 another modification shown is made of wire bent to form a loop 61, on one end of which is the eyelet 63, the other end of which is bent towards the loop 61 to form the tine 65. The hook is shown attached to the belt 66.

The form in Fig. 15 also has a loop 71 and tine 75 formed of bent wire and is similar to Fig. 14, except that the end 73 of the wire is flattened with the eyelet 77 punched therein.

The tines 65 and 75 of the modifications in Figs. 14 and 15 respectively are, after having been bent to form a V as shown in Fig. 15, placed over the end of a belt and pressed by a pincer tool. In these cases, however, the tine engages a jaw of the tool and is bent positively around the end of the eyelet.

In each case, it is practically impossible to dislodge the hooks because of the inter-engagement of the two ends through the tine-opening combinations.

The invention above described is not to be limited to the specific showing, but only as limited by the following claims.

I claim:

1. A belt hook of sheet material comprising two end portions and an intermediate portion, each of said end portions having a tine extending beyond the outer edge thereof and an opening spaced inwardly from said outer edge, the material between said opening and said end being arched transversely whereby to provide a web, the material on the side of said opening opposite said web being oppositely arched and inclined towards the opening whereby to provide a guide surface, the tine on one end being opposite the opening on the other end.

2. A belt hook stamped from sheet metal comprising two end portions and an intermediate portion, said intermediate portion comprising a plurality of elongated strips of material spaced from one another and integral with said end portions, each of said end portions having a plurality of tines extending beyond the outer edge thereof, and transverse slits between said tines and spaced inwardly from said outer edge, the metal between each of said slits and said outer edge being bent upwardly from one side of said sheet whereby to provide a transverse web, the metal on the inner side of said slit being bent oppositely from said web and inclined towards said slit whereby to form a guide surface, the tines on one end portion being staggered relative to the tines on the other end so that each tine is opposite a slit whereby, when the intermediate portion is bent to form a V and said tines are bent inwardly, the points of the tines will engage said guide surfaces when the end portions are pressed towards each other.

3. A belt hook comprising an elongated strip of bendable material having a tine at one end and an eyelet at the other end, said eyelet being in the form of a transverse slit in said material, the material on at least one side of said slit being depressed from the plane of said strip whereby to provide a guide surface for said tine.

4. A belt hook formed of an elongated piece of material bent intermediate its end portions to form a V, one of said end portions being flat and having an eyelet punched therein, the other of said end portions being substantially rounded in cross section and pointed at its free end.

5. A blank for forming belt hook comprising an elongated substantially flat strip of material having two end portions and an intermediate portion, each of said end portions having a tine and a pair of openings adjacent said tines and set inwardly from the outer edge, the tine on one end being opposite the openings on the other end and being in alignment with said openings.

6. A belt hook comprising an elongated strip of bendable material having two end portions and an intermediate portion, each of said ened portions having a tine extending outwardly beyond the outer edge thereof and a pair of openings set inwardly from the outer edge, the tine on each end being opposed to and in alignment with openings on the other, said openings extending at an angle through said strip of material whereby to provide an inclined surface at the side of said opening whereby, when said tine engages said inclined surfaces after passing successively through said openings, said tine will be recurved.

7. A belt hook as claimed in claim 6, the opening having the inclined surface at the side thereof being the outer member of each pair.

8. A belt hook comprising an elongated strip of bendable material having two end portions and an intermediate portion, each of said end portions having a tine extending outwardly beyond the outer edge thereof and a pair of openings set inwardly from the outer edge, the openings on each end being opposed to and in alignment with the tine on the other end, each of the openings in said pairs extending at an angle through the strip whereby to provide an inclined surface at the outer side of each outer opening and on the inner side of each inner opening.

9. A belt hook as claimed in claim 8, the material between the openings in each pair being bent to provide a grooved channel between the openings.

10. A belt hook as claimed in claim 5, the material between the openings in each pair being bent inwardly from one side of said strip whereby to provide a grooved channel between the openings, the said channel being aligned with the opposing tine on the other end.

11. A belt hook comprising an elongated strip of bendable material having two end portions and an intermediate portion, each of said end portions having a tine extending outwardly beyond the outer edge thereof and a pair of openings set inwardly from the outer edge, each of said end portions having a slot extending inwardly from the outer edge between a portion of said tine and said openings, the openings on each end being opposed to and in alignment with the tine on the other end, each of the openings in each pair extending at an angle through the strip whereby to provide an inclined surface at the outer side of each outer opening and at the inner side of each inner opening, the material between the openings in each pair being bent inwardly from one side of said strip whereby to provide a grooved channel between the openings, the said channel being aligned with the opposing tine on the other end.

12. A belt hook as claimed in claim 11, said intermediate portion comprising a plurality of spaced strips of said material integral at their ends with said end portions.

13. A belt hook comprising an upper plate, a lower plate and an intermediate connecting portion, said upper plate having at least one pair of openings therein, said lower plate also having at least one pair of openings therein, the openings in said lower plate extending therethrough at an angle whereby to provide inclined surfaces so that when said belt hook is bent V shaped and the legs of a staple are placed in the openings in the top plate each of said legs will, upon pressing said plates towards one another, engage the inclined surface on one side of one of the openings in said lower plate and be bent back through the other of said openings.

14. A belt hook comprising an upper plate, a lower plate and an intermediate portion connecting one end of each of said plates, said upper plate being corrugated transversely and having openings therethrough in the channels of said corrugations, said lower plate being corrugated longitudinally and having opposed openings through the side walls of said longitudinal corrugations.

15. A belt hook as claimed in claim 14, and staples secured to said upper plate, the legs of said staples extending through the openings in said upper plate.

16. A belt hook comprising an upper plate, a lower plate and an intermediate portion connecting one end of each of said plates, said upper plate being corrugated transversely and having pairs of openings therethrough in the channels of said corrugations, said lower plate being corrugated longitudinally and having pairs of opposed openings through the side walls of said longitudinal corrugations, the pairs of openings through said lower plate being substantially below those through said upper plate.

17. A belt hook as claimed in claim 16, the distance between the members of the pairs of openings in said lower plate being less than the distance between the members of the pair thereabove in said upper plate.

18. A belt hook comprising an upper plate, a lower plate and an intermediate portion connecting one end of each of said plates, at least one pair of tines secured to said upper plate and extending downwardly from the lower surface thereof, said lower plate having a pair of openings extending therethrough at an angle whereby to provide an inclined surface at each of the outer sides thereof, the distance between said tines being less at their points than at said upper plate, the distance between the members of the pair of openings also being less than the distance between said tines at the upper plate.

19. A belt hook comprising an upper plate, a lower plate and an intermediate portion connecting one end of each of said plates, said upper plate being corrugated in one direction and having a plurality of pairs of openings therethrough in the channels of said corrugations, said lower plate being corrugated transversely with respect to the corrugations in said upper plate and having a plurality of pairs of opposed openings through the side walls of the corrugations, one opening of each pair in the lower plate being on one side of a corrugation and the other opening being on the other side, the pairs of openings through the lower plate being below the pairs in the upper plate, respectively.

20. In a belt hook as claimed in claim 19, staples secured to said upper plate, the tines thereof extending through the pairs of openings in said upper plate.

21. A belt hook as claim in claim 19, and tab members integral with said lower plate, each of said tab members extending downwardly from the lower side of said plate adjacent the outer side of each member of said pairs of openings whereby to provide a guide surface.

HANS-JOACHIM ZILLER.